United States Patent [19]

Everhardus et al.

[11] Patent Number: 6,071,986
[45] Date of Patent: Jun. 6, 2000

[54] INK COMPOSITION FOR A MELTABLE INK

[75] Inventors: Roelof Hendrik Everhardus, Lomm; Ronald Groothuijse, Sevenum; Erik Kelderman, Venlo; Clemens T. Weijkamp, Zijtaart, all of Netherlands

[73] Assignee: Oce-Technologies, B.V., Venlo, Netherlands

[21] Appl. No.: 09/018,567

[22] Filed: Feb. 4, 1998

[30] Foreign Application Priority Data

Feb. 4, 1997 [NL] Netherlands ............... 1005174

[51] Int. Cl.$^7$ ............... C09D 11/02; C08F 122/36; C08G 18/72; C08L 33/24; C08L 75/04
[52] U.S. Cl. ............... 523/160; 525/451; 525/521
[58] Field of Search ............... 523/160, 161; 106/31.29, 31.3, 31.31, 31.34, 31.35, 31.61, 31.62, 31.63, 31.67; 525/451, 521

[56] References Cited

U.S. PATENT DOCUMENTS

| | | | |
|---|---|---|---|
| 4,267,000 | 5/1981 | Dix et al. | 156/235 |
| 4,758,475 | 7/1988 | Eckes et al. | 428/423.1 |
| 5,006,582 | 4/1991 | Mancinelli | 524/271 |
| 5,122,187 | 6/1992 | Schwarz et al. | |
| 5,185,234 | 2/1993 | Nakatsukasa et al. | 430/284.1 |
| 5,219,657 | 6/1993 | Ueoka et al. | 428/379 |
| 5,250,109 | 10/1993 | Chan et al. | 106/31.43 |
| 5,421,868 | 6/1995 | Ayalia-Esquilin et al. | |
| 5,574,078 | 11/1996 | Elwakil | 523/161 |
| 5,621,022 | 4/1997 | Jaeger et al. | 523/161 |
| 5,662,736 | 9/1997 | Sakai et al. | 106/31.29 |
| 5,667,568 | 9/1997 | Sacripante et al. | 106/31.29 |
| 5,750,605 | 5/1998 | Blumenthal et al. | 524/230 |
| 5,753,017 | 5/1998 | Onodera et al. | 106/31.49 |
| 5,827,918 | 10/1998 | Titterington et al. | 524/590 |
| 5,855,977 | 1/1999 | Fukushi et al. | 428/36.6 |

FOREIGN PATENT DOCUMENTS

| | | |
|---|---|---|
| 0404493 A2 | 12/1990 | European Pat. Off. . |
| 0475707 A2 | 3/1992 | European Pat. Off. . |
| 0610090 A1 | 8/1994 | European Pat. Off. . |
| 0700977 A1 | 3/1996 | European Pat. Off. . |
| 96 15201 | 5/1996 | WIPO . |

OTHER PUBLICATIONS

Brandrup, J. and Immergut, E.H.; Polymer Handbbook, John Wiley and Sons, New York (pp. 231–232, 238–239, and 242–245), 1989.

*Primary Examiner*—Vasu Jagannathan
*Assistant Examiner*—Callie E. Shosho
*Attorney, Agent, or Firm*—Birch, Stewart, Kolasch & Birch, LLP

[57] ABSTRACT

An ink composition for a meltable ink, usable in printing devices in which ink droplets are ejected from ducts, which composition contains a meltable base material, wherein the ink composition also contains an amorphously setting monomer compound and an amorphous polymer or oligomer binder and the base material is a crystalline-setting monomer compound. The flow and setting properties and the stiffness of the ink is adjusted by the choice and relative proportion of the constituents.

8 Claims, No Drawings

INK COMPOSITION FOR A MELTABLE INK

This invention relates to an ink composition for a meltable ink, usable in printing devices in which ink droplets are ejected from ducts, which composition contains a meltable base material. The base materials may be synthetic and natural waxes, alcohols, carboxylic acid and sulphonic acid amides and the like. Suitable materials are indicated, for example, in U.S. Pat. No. 5,122,187. The prior art ink compositions in the set state generally yield on receiving materials printed ink layers which are too brittle or just too soft, with the result that the gum, scratch and fold resistance, particularly of double layers, i.e. different ink layers of, for example, different colours on one another, is not up to standard. To toughen ink formulations which are too brittle, or make too soft crystalline materials stiffer, the addition of an amorphous binder is necessary, with or without the combination of a monomer plasticiser. However, as a result of the considerable viscosity increase in the melted state, caused by such an addition, only a low concentration (up to about 20% by weight) of amorphous polymer or oligomer binder can be used.

The viscosity increase in the melted state is undesirable because the resulting inks generally penetrate unsatisfactorily into the receiving material (e.g. paper), with the result that thick layers form on the receiving material which are mechanically vulnerable. With a viscosity increase the ink is also no longer reliably sprayed, certainly if spray heads having nozzle diameters below 45 µm are used. In the case of a low concentration of amorphous polymer, inadequate stiffness and/or excessive brittleness of the ink compositions in the set state occurs. There is therefore a dilemma with the existing ink compositions: the required stiffness in the set state versus a desirable relatively low viscosity at the working temperature. It has also been found in practice that ink formulations in which two or more materials are present are frequently unstable over time, even if the ink has already been sprayed on a receiving material. Thus with mixtures of crystalline and amorphous materials there is frequently a disturbing after-crystallisation, as a result of which colour changes may occur and prints may become opaque, this being an obstacle, for example, if these ink compositions are used on an overhead sheet.

What is required, therefore, is an ink composition in which a considerable quantity of amorphous binder can be dissolved so that the stiffness after the setting of the ink composition is increased while the viscosity of the resulting ink composition has a value at 120–130° C. such that the ink compositions can be used in printing devices having a nozzle with a diameter of less than 45 µm. In addition, the ink composition must have a good jet stability and gum, scratch and fold resistance and not exhibit any disturbing after-crystallisation.

The ink composition according to the present invention as indicated in the preamble is characterised in that the ink composition also contains an amorphously setting monomer compound and an amorphous polymer or oligomer binder and the base material is a crystalline-setting monomer compound.

According to the present invention, it is now possible, by the combination of these three constituents, to adjust the flow and setting characteristics by optimal choice of the relative proportions of the above-mentioned constituents.

The amorphously setting monomer compound preferably has a glass transition temperature (Tg) of 10–50° C., a viscosity less than 100 mPa.s at 150° C. and has a molecular weight lower than 1000 g/mol.

If an amorphously setting monomer compound having a Tg value higher than 50° C. is used in the ink composition, the resulting ink is too brittle and too highly viscous. A Tg value lower than 10° C. leads to an ink composition which at ambient temperature has a setting characteristic such that, for example, paper printed with such an ink sticks together. A viscosity higher than 100 mpa.s at 150° C. results in an unsatisfactory spray behaviour in the printing devices. If the molecular weight is more than 1000 g/mol, the viscosity will be outside the said range and the ink will be hardly processable, if at all.

Amorphously setting monomer compounds are, for example, compounds which have the property that they set mainly amorphously even at cooling rates of about 50° C./min, which are relatively low in comparison with the cooling rate of ink droplets on a receiving material.

By the combination of the three constituents it is possible to increase drastically to 40% by weight the amorphous fraction (amorphously setting monomer and amorphous polymer or oligomer binder) in the ink composition while the low viscosity is retained.

Even a 75% amorphous fraction is possible if the lowest viscous monomer compounds are used having a viscosity of less than 50 mPa.s at 150° C.

The amorphously setting monomer compound is preferably a compound selected from the group of bis-urethanes, esters of pentaerythritol and dipentaerythritol, carbonates of dipentaerythritol, reaction products of epoxides and alcohols, bis-amides, bis-sulphonamides, or mixtures of these compounds.

Bis-urethanes preferably used are the reaction product of isophorone diisocyanate with methyl alcohol or the reaction product of 4,4' dicyclohexyl methane diisocyanate with benzyl alcohol.

The esters of pentaerythritol and dipentaerythritol are preferably the benzoate, toluate and anisilate esters.

The carbonates of dipentaerythritol are preferably phenyl carbonates or substituted phenyl carbonates.

The reaction products of epoxides and alcohols are preferably reaction products of the diglycidyl ether of bisphenol A with alkyl or cycloalkyl substituted phenols. It is also possible to select compounds from the group of asymmetrical bis-amides as given in U.S. Pat. No. 5,421,868 and from the symmetrical bis-amides and bis-sulphonamides. It is possible to use mixtures of the above compounds.

Although the above amorphously setting compounds are usable on their own as ink, they are in practice too highly viscous at the working temperature of about 130° C., and this gives rise to problems when small nozzles are used. Also, the printed images are frequently unstable in time. Ultimately crystallisation mostly occurs, so that brittleness increases and transparency decreases.

The amorphously setting monomer compound does not simply function as a plasticiser, but as a stiffening binder with a low viscosity, without a drastic Tg reduction of the complete ink composition.

If the same Tg reduction of the oligomer or polymer binder is obtained by an effective oily plasticiser, such as, for example, dioctyl phthalate instead of by an amorphously setting monomer compound, the result obtained is not good. In that case the product is more coarsely crystalline, being more opaque and less stiff.

The amorphous polymer or oligomer binder has a glass transition temperature (Tg) preferably between 25 and 120° C., a weight-averaged molecular weight of between 1000 and 15000 g/mol, measured on the basis of polystyrene standards, and a viscosity greater than 1000 mPa.s at 150° C. A viscosity lower than 1000 mPa.s gives an insufficiently stiff binder which will generally be too brittle and will tend to crystallise. If the Tg value is less than 25° C., the ink composition obtained is too tacky and at a Tg value of above 120° C. the viscosity will be too high. The amorphous polymer or oligomer binder used may be reaction products of hydrogenated rosins with, for example, glycerol and pentaerythritol or the condensation product of acetophenone and formaldehyde such as Kunstharz SK or AP (registered trademark of Hüls) are used or cyclohexanone condensation resins such as Kunstharz CA (registered trademark of Hüls) copolymers of styrene, acrylate and methacrylate, allyl alcohol, and the like and various (co)polyesters such as Dynacol 7130 and 7150 (registered trademark of Hüls) or polyethylene phthalate (Crystalbond 509, 91) and mixtures of these compounds. The Tg value of the above-mentioned condensation product Kunstharz SK is 88° C. and the weight-averaged molecular weight is about 1350 (measured on the basis of polystyrene standards).

In addition to the strongly stiffening effect of the polymer or oligomer material on the ink, it also suppresses any occurrence of crystallisation of the amorphously setting monomer constituent in the course of time.

The base material, which is a crystalline-setting monomer, preferably has a melting point lower than 110° C. and a viscosity of 1–10 mpa.s at 150° C.

Preferably, crystalline base materials are possibly selected from the group of aliphatic alcohols, such as dodecane diol and hexadecane diol, or aromatic compounds such as 1-0-para-anisyl glycerol, meta-toluamide, para-n-butylbenzene sulphonamide and mixtures of these compounds.

In the case of predominantly crystalline inks, the ink composition according to the present invention preferably consists of a quantity of crystalline setting monomer compound between 60% by weight and 90% by weight, a quantity of amorphously setting monomer compound between 5% by weight and 20% by weight, and a quantity of amorphous polymer or oligomer binder between 5% by weight and 20% by weight, based on the total ink composition. Crystalline-setting monomers having a difference between the melting temperature and the crystallisation temperature (Tm-Tc) of less than 50° C. (DSC, 20° C. per minute) are most suitable in these inks.

If the quantity of amorphously setting monomer compound used is more than 20% by weight, then the ink composition obtained is generally too soft, certainly if the crystalline material has naturally an ample crystallisation retardation so that it takes various seconds before the image is solid. If the quantity of amorphously setting monomer used is less than 5% by weight, then the ink composition obtained is not sufficiently stiff. The quantity of amorphous polymer or oligomer binder must be less than 20% by weight since otherwise the viscosity of the ink composition becomes too high.

Nevertheless, according to the invention, predominantly amorphous inks can be prepared in which the amorphous fraction (the amorphously setting monomer and the amorphous polymer or oligomer together) constitutes more than 50% by weight. In that case, the crystalline-setting monomer should be a compound which naturally crystallises rapidly, since otherwise the ink remains oily on the paper for too long. In addition, the viscosity of the amorphous fraction should not be too high. Crystalline-setting monomers with a difference between the melting temperature and the crystallisation temperature (Tm-Tc) of less than 25° C. (DSC, 20° C. per minute) are excellent for this purpose.

The predominantly amorphous ink according to the invention preferably has the following composition:
Rapidly setting crystalline monomer (25–45% by weight), e.g. 1,12-dodecane diol), amorphously setting monomer (45–65% by weight, e.g. pentaerythritol tetrabenzoate) and 5–10% by weight of amorphous polymer or oligomer binder, e.g. Kunstharz SK (™Hüls).

This composition is sufficiently stiff and has a sufficiently low viscosity at the jet temperature.

The viscosity of the finally obtained ink composition at 130° C. is preferably less than 25 mPa.s. If the viscosity of the finally obtained ink compositions at 130° C. is greater than 25 mpa.s, the ink composition cannot be satisfactorily used in printing devices provided with ink ducts of a diameter less than 45 μm, since droplets can no longer be formed satisfactorily. Also, a thick layer forms on the receiving material. The ink then penetrates inadequately into the receiving material. The spreading behaviour and penetration behaviour of the ink accordingly leave much to be desired.

The present invention will be explained in detail with reference to the following examples.

Table 1 gives a selection of amorphously setting monomer resins.

Table 2 is a survey of some amorphous oligomer or polymer materials.

Table 3 is a selection of crystalline-setting monomers (base materials).

Table 4 is a survey of ink formulations.

Table 1

Part A of Table 1 gives compounds of pentaerythritol: I pentaerythritol tetra-acetate, II pentaerythritol tetra-benzoate, III, IV, V respectively the meta, ortho and para-toluate esters, VI is a statistically synthetic mixture of the ortho and para-toluate compounds. VII is the tetra-anisilate compound, VIII is the tetra-carbonate compound.

The compounds IX to XV are the similar di-pentaerythritol compounds. These are given in Part B of Table 1. The esters and carbonates respectively of pentaerythritol and dipentaerythritol (Table 1A and 1B) are easily synthesised by reacting the said tetra and hexa hydroxy compounds with benzoylchlorides and phenyl chloroformate respectively, which may or may not be substituted. Part C of Table 1 gives compounds of isophorone diisocyanate with an aliphatic alcohol (e.g. isopropyl alcohol, methyl alcohol, ethyl alcohol) or aromatic alcohol (e.g. benzyl alcohol). The compounds of 4,4'-dicyclohexylmethane diisocyanate with an alcohol (e.g. benzyl alcohol, methyl ethylene glycol and phenyl ethyl alcohol) are given in Part D of Table 1. Part E of this Table gives details of some other bis-urethanes based on diphenyl methane diisocyanate and an alcohol.

Part F gives the details of some reaction products of dyglycidyl ether of bis-phenol A with respectively phenol (XXVI), cyclohexyl phenol (XXVII) and tert.-amyl phenol (XXVIII).

The Table indicates whether the materials are usable as amorphously setting monomer in the ink according to the invention.

Table 2

Table 2 clearly shows that the amorphous oligomer, for optimum functioning, preferably has a weight-averaged molecular weight of above 1000 measured on the basis of polystyrene standards and a viscosity at 150° C. of more than 1000 mPa.s.

Table 3

Table 3 is a survey of crystalline-setting monomers, including a number of crystalline bis-urethanes (reaction products of hexamethylene diisocyanate and respectively methyl ethylene glycol, ethyl ethylene glycol, hexanol and phenyl ethyl alcohol). In addition there are a number of sulphonamides (respectively para-toluene sulphonamide, a mixture of ortho and para-toluene sulphonamide, para-ethyl benzene sulphonamide and a mixture of para-toluene sulphonamide and para-ethyl benzene sulphonamide and para-n-butyl benzene sulphonamide. Details of some (di)-alcohols and some other compounds are also given.

A crystalline-setting monomer compound suitable for use as a base material according to the present invention has a melting point lower than 110° C. and forms a finely crystalline material after crystallisation.

Table 4

Table 4 gives details of various ink formulations, wherein CM stands for crystalline monomer, ASM stands for amorphously setting monomer and AOP for amorphous oligomer or polymer, Tm and Tc respectively stand for melting and crystallisation temperature (both measured at cooling/heating rates of 20° C./min) and h 130° C. stands for the viscosity (mPa.s) measured at 130° C. of the total ink formulation.

Inks 1, 2, 3, 5, 6, 9, 13, 15, 17–19, 24, 25, 27–30, 36, 37, 40, 44, 45 and 48 are not formulations according to the invention. These inks are either too brittle or insufficiently stiff directly after printing or within a few hours after printing. Although composition 4 has a reasonable flow on the receiving material, the resulting image is not very stiff because of the low viscosity of the AOP (the amorphous oligomer or polymer). The compositions 7, 8, 10–12, 14 and 16 are all inks based on 1,12-dodecane diol as the base material, and they are in accordance with the invention. Although these compositions have little flow on the receiving material the resulting images are sufficiently stiff. The inks 20–23 and 26 based on HMDI-MEG as the base material have a good flow and are stiff as printed images. The inks based on para-n-butyl benzene sulphonamide (inks 31–35) also give good results. The other inks according to the invention 38, 39, 41–43, 46 and 47 flow sufficiently well and are stiff. Ink composition 49 has too great a crystallisation retardation for practical use.

Of course the conventional additions can be made to the inks, e.g. dyes, colour pigments, pigments, anti-oxidants such as Vanox 1005 (Vanderbilt) and surfactants.

Table 1 Selection of amorphously setting monomer resins (ASM)

TABLE 1

Selection of amorphously setting monomer resins (ASM)

| No. | R (abbreviation) | TM (° C.) | TG (° C.) | η 150° C. (mPa · s) | Amorphously setting?* | Usability assessment |
|---|---|---|---|---|---|---|
| A | | | | | | |
| I | $CH_3$— (PETA) | 84 | — | 2 | no | Not an amorphously setting monomer but crystalline material |
| II | $C_6H_5$— (PETB) | 105 | 19 | 17 | yes | Usable |
| III | ortho $CH_3$—$C_6H_5$— (PET2T) | 96 | −2 | ** | "yes" | Too tacky, too plasticising |
| IV | meta $CH_3$—$C_6H_5$— (PET3T) | 110 | 7 | 18 | yes | Too plasticising |
| V | para $CH_3$—$C_6H_5$— (PET4T) | 148 | 27 | 25 | yes | Usable |
| VI | meta/para (15/85) $CH_3$—$C_6H_5$— (PET3, 4T) | 127 | 22 | 25 | yes | Usable (statistically synthetic mixture) |
| VII | para $CH_3O$—$C_6H_5$— (PET-ANI) | 129 | 32 | 60 | yes | Usable |
| VIII | $C_6H_5O$— (PET-PC) | 145 | — | ** | no | Unusable; crystalline, viscous |
| B | | | | | | |
| IX | $CH_3$— (di-PETA) | 63 | — | ** | no | Not usable |
| X | $C_6H_5$— (di-PETB) | 186 | 29 | ** | yes | Too viscous, melting point too high |
| XI | ortho $CH_3$—$C_6H_5$ (di-PET2T) | 123 | 10 | 24 | yes | Usable |
| XII | meta $CH_3$—$C_6H_5$— (di-PET3T) | 132 | 15 | 58 | yes | Usable |

TABLE 1-continued

Selection of amorphously setting monomer resins (ASM)

| No. | R (abbreviation) | TM (° C.) | TG (° C.) | η 150° C. (mPa·s) | Amorphously setting?* | Usability assessment |
|---|---|---|---|---|---|---|
| XIII | para CH$_3$—C$_6$H$_5$— (di-PET4T) | 159 | 37 | ** | yes | Too viscous, melting point too high |
| XIV | para CH$_3$O—C$_6$H$_5$— (di-PET-ANI) | 146 | 44 | 220 | yes | Too viscous |
| XV | C$_6$H$_5$O— di-PET-PC | 136 | 30 | 51 | yes | Usable |
| C | | | | | | |
| XVI | iso-C$_3$H$_7$— (IPDI-IPA) | 122/123 | 24 | 6 | partially | Unreliable; crystallisation tendency |
| XVII | CH$_3$— (IPDI-MA) | — | 30 | 12 | yes | Usable |
| XVIII | C$_2$H$_5$— (IPDI-EA) | — | 10 | 8 | yes | Border line case, usable (tacky) |
| XIX | C$_6$H$_5$—CH$_2$— (IPDI-BA) | — | 20 | 10 | yes | Usable |
| D | | | | | | |
| XX | C$_6$H$_5$—CH$_2$— (CMDI-BA) | 130 | 14 | 10 | yes | Usable |
| XXI | CH$_3$O—CH$_2$—CH$_2$— (CMDI-MEG) | 107 | ** | ** | oil | Not usable |
| XXII | C$_6$H$_5$—CH$_2$—CH$_2$— (CMDI-PEA) | 116 | 13 | 20 | yes | Usable |
| E | | | | | | |
| XXIII | C$_2$H$_5$— (MDI-EA) | 132 | ** | ** | oil | Not usable, thermally unstable |
| XXIV | iso-C$_3$H$_7$— (MDI-IPA) | 154 | 27 | ** | partially | Unreliable, thermally unstable |
| XXV | CH$_3$O—CH$_2$—CH$_2$— (MDI-MEG) | 99 | 3 | 13 | partially | Too plasticising, thermally unstable |
| F | | | | | | |
| XXVI | C$_6$H$_5$— (PBPA-PP) | 120 | 45 | 80 | yes | Usable |
| XXVII | C$_6$H$_{11}$— (PBPA-CHP) | — | 39 | 80 | yes | Usable |
| XXVIII | tert C$_5$H$_{11}$— (PBPA-AP) | — | 30 | 50 | yes | Usable |

*Cooling rate about 50° C./min.
**Not determined

TABLE 2

Selection of amorphous oligomer/polymer (AOP)

| No. | Name (trade name) (Abbreviation) | Chemical description | TG (° C.) | Mw* (g/mol) | η 150° C. (mPa·s) | Assessment |
|---|---|---|---|---|---|---|
| A | Foral 85E (Hercules ™) (F85E) | Glycerol ester of hydrogenated rosin | 37 | 1000 | 250 | Little stiffening action |
| B | Foralyn 110 (Hercules ™) (F110) | Pentaerythritol ester of hydrogenated rosin | 54 | 1300 | 500 | Little stiffening action |
| C | Uratak 68520 (DSM ™) (U68520) | Phenolic poly-α-methyl styrene | 37 | 880 | 350 | Little stiffening action |
| D | Crystalbond 509 (Printlas ™) (CB509) | Polyethylene phthalate | 30 | 4000 | 1000 | Usable |
| E | (Aldrich) (PSAA) | Styrene allyl alcohol copolymer | 59 | 1600 | 3000 | Usable |
| F | Dynacoll 7130 (Hüls ™) (D7130) | Copolyester | 27 | 7100 | 3400 | Usable |
| G | Dynacoll 7150 (Hüls ™) (D7150) | Copolyester | 46 | 6100 | 7500 | Usable |
| H | Kunstharz AP (Hüls ™) (KHAP) | Acetophenone formaldehyde condensation product | 47 | 1100 | 500 | Little stiffening action |
| I | Kunstharz SK (Hüls ™) (KHSK) | Reduced acetophenone formaldehyde condensation product | 89 | 1350 | 25000 | Usable |
| J | Kunstharz CA (Hüls ™) (KHCA) | Cyclohexanone aldehyde condensation product | 69 | 1050 | 5000 | Usable |

TABLE 2-continued

Selection of amorphous oligomer/polymer (AOP)

| No. | Name (trade name) (Abbreviation) | Chemical description | TG (° C.) | Mw * (g/mol) | η 150° C. (mPa · s) | Assessment |
|---|---|---|---|---|---|---|
| K | Kunstharz EP-TC (Hüls ™) (KHEP) | Ketone aldehyde condensation product | 28 | 750 | 140 | Little stiffening action |

* Measured as being polystyrene

TABLE 3

Selection of crystalline-setting monomers (CM)

| No. | Chemical name/formula (abbreviation) | Tm (° C.) | Tc (° C.) | Tm–Tc (° C.) | η 150° C. (mPa · s) | Assessment |
|---|---|---|---|---|---|---|
| | Bis-urethanes | | | | | |
| | R is: | | | | | |
| 1 | $CH_3O$—$CH_2$—$CH_2$— (HMDI-MEG) | 77 | 48 | 29 | 5 | Usable in predominantly crystalline inks |
| 2 | $C_2H_5O$—$CH_2CH_2$— (HMDI-EEG) | 73 | 48 | 25 | 5 | Usable in predominantly crystalline inks |
| 3 | $C_6H_{13}$— (HMDI-HA) | 100 | 84 | 16 | 6 | Usable |
| 4 | $C_6H_5$—$CH_2$—$CH_2$— (HMDI-PEA) | 132 | 98 | 34 | 11 | Melting point too high |
| | Sulphonamides | | | | | |
| | R is: | | | | | |
| 5 | para $CH_3$— (p-TSA) | 142 | 108 | 34 | 4 | Melting point too high |
| 6 | ortho-para (40/60) $CH_3$— (o/p-TSA) | 113 | 70 | 43 | 4 | Visually disturbing after-crystallisation, too opaque |
| 7 | para $C_2H_5$— (p-EBSA) | 112 | 86 | 26 | 4 | Stepwise crystallisation, unreliable |
| 8 | p-TSA/p-EBSA 1:1 | 108 | 83 | 25 | 4 | Usable |
| 9 | para n-$C_4H_9$— (p-BuBSA) | 101 | 64 | 37 | 3 | Usable in predominantly crystalline inks |
| | Alcohols | | | | | |
| 10 | 1,2-hexadecanediol (1,2-HDD) | 74 | 56 | 18 | 3 | Usable |
| 11 | 1,12-dodecanediol (1,12-DDD) | 87 | 70 | 17 | 3 | Usable |
| 12 | 4-bi-phenyl methanol (4-BPM) | 104 | 88 | 16 | 2 | Usable |
| 13 | 1,4 hydroquinone bis (2-hydroxyethyl) ether (HQHE) | 109 | 84 | 25 | 3 | Usable |
| 14 | 1,4 benzene dimethanol (1,4 BDM) | 123 | 81 | 42 | 2 | Melting point too high |
| 15 | 1-O-p-anisylglycerol (ANGLY) | 82 | 60 | 22 | 3 | Usable |
| 16 | Phenyl 1,2-ethane diol (PED) | 68 | 17 | 51 | 2 | Crystallisation retardation excessive |
| | Various | | | | | |
| 17 | Meta-toluamide (m-TAM) | 97 | 64 | 33 | 2 | Usable |
| 18 | Dimethyl isophthalate (DMiPH) | 74 | 35 | 39 | 1 | Tc too low (crystallises with difficulty in binder) |
| 19 | Pentaerythritol-tetra-acetate (PETA) | 84 | 21 | 63 | 2 | Crystallisation retardation excessive |

TABLE 4

Selection of inks

| No | % by wt. | CM | % by wt. | ASM | % by wt. | AOP | Tm °C. | Tc °C. | Tm–Tc °C. | η 150° C. (mPa·s) | Assessment of print result, particularly directly after printing |
|---|---|---|---|---|---|---|---|---|---|---|---|
| 1 | 80 | 1,12-DDD | — | — | 20 | F85E | 86 | 65 | 21 | 6 | Little flow, not stiff |
| 2 | 70 | 1,12-DDD | — | — | 30 | F85E | 85 | 63 | 22 | 8 | Little flow, not stiff |
| 3 | 80 | 1,12-DDD | — | — | 20 | F110 | 84 | 64 | 20 | 6 | Little flow, not stiff |
| 4 | 70 | 1,12-DDD | 10 | PETB | 20 | F110 | 80 | 52 | 28 | 7 | Reasonable flow, not stiff |
| 5 | 90 | 1,12-DDD | — | — | 10 | KHSK | 83 | 60 | 23 | 6 | Little flow, somewhat brittle |
| 6 | 80 | 1,12-DDD | — | — | 20 | KHSK | 81 | 55 | 26 | 7 | Little flow, somewhat brittle |
| 7 | 60 | 1,12-DDD | 20 | PETB | 20 | KHSK | 82 | 54 | 26 | 9 | Little flow, reasonably stiff |
| 8 | 60 | 1,12-DDD | 20 | IPDI-MA | 20 | KHSK | 79 | 52 | 27 | 9 | Little flow, reasonably stiff |
| 9 | 30 | 1,12-DDD | 70 | PETB | — | — | 80 | 65 | 15 | 10 | Little flow, too soft |
| 10 | 30 | 1,12-DDD | 60 | PETB | 10 | KHSK | 82 | 62 | 20 | 13 | Little flow, reasonably stiff |
| 11 | 30 | 1,12-DDD | 45 10 10 | PETB PET4T PET3T | 5 | KHSK | 82 | 59 | 23 | 10 | Little flow, reasonably stiff |
| 12 | 60 | 1,12-DDD | 20 10 | PETB PBPA-PP | 10 | KHSK | 82 | 58 | 24 | 11 | Little flow, stiff |
| 13 | 85 | 1,12-DDD | — | — | 15 | PSAA | 84 | 63 | 21 | 8 | Little flow, too brittle |
| 14 | 75 | 1,12-DDD | 10 | IPDI-MA | 15 | PSAA | 82 | 60 | 22 | 10 | Reasonable flow, reasonably stiff |
| 15 | 80 | 1,12-DDD | — | — | 20 | KHCA | 86 | 62 | 24 | 7 | Little flow, not stiff |
| 16 | 70 | 1,12-DDD | 10 | IPDI-MA | 20 | KHCA | 83 | 57 | 26 | 9 | Reasonable flow, reasonably stiff |
| 17 | 90 | HMDI-MEG | — | — | 10 | KHSK | 74 | 43 | 31 | 8 | Reasonable flow, not stiff enough |
| 18 | 85 | HMDI-MEG | — | — | 15 | KHSK | 72 | 17 | 55 | 10 | Reasonable flow, not stiff enough |
| 19 | 75 | HMDI-MEG | — | — | 25 | KHSK | 69 | 8 | 61 | 16 | Reasonable flow, remains soft too long |
| 20 | 85 | HMDI-MEG | 5 | IPDI-MA | 10 | KHSK | 72 | 39 | 33 | 9 | Good flow, stiff |
| 21 | 80 | HMDI-MEG | 10 | IPDI-MA | 10 | KHSK | 71 | 20 | 51 | 11 | Good flow, stiff |
| 22 | 80 | HMDI-MEG | 10 | CMDI-BA | 10 | KHSK | 72 | 27 | 45 | 11 | Good flow, stiff |
| 23 | 80 | HMDI-MEG | 10 | PBPA-AP | 10 | KHSK | 73 | 35 | 38 | 12 | Good flow, stiff |
| 24 | 80 | HMDI-MEG | — | — | 20 | CB509 | 73 | 25 | 48 | 13 | Reasonable flow, not stiff enough |
| 25 | 85 | HMDI-MEG | — | — | 15 | CB509 | 75 | 29 | 46 | 11 | Reasonable flow, not stiff enough |
| 26 | 80 | HMDI-MEG | 5 | PETB | 15 | CB509 | 75 | 22 | 53 | 12 | Good flow, stiff |
| 27 | 90 | p-BuBSA | — | — | 10 | CB509 | 93 | 54 | 39 | 8 | Reasonable flow, too brittle |
| 28 | 80 | p-BuBSA | — | — | 20 | CB509 | 92 | 48 | 44 | 13 | Reasonable flow, becomes too brittle after a few minutes |
| 29 | 80 | p-BuBSA | — | — | 20 | D7130 | 92 | 42 | 50 | 23 | Reasonable flow, becomes too brittle after a few minutes |
| 30 | 80 | p-BuBSA | — | — | 20 | D7150 | 91 | 40 | 51 | 25 | Reasonable flow, becomes too brittle after a few minutes |
| 31 | 80 | p-BuBSA | 10 | PETB | 10 | CB509 | 90 | 49 | 41 | 10 | Good flow, reasonably stiff |
| 32 | 70 | p-BuBSA | 20 | PETB | 10 | CB509 | 89 | 43 | 46 | 12 | Good flow, stiff |
| 33 | 70 | p-BuBSA | 10 | PETB | 20 | CB509 | 88 | 38 | 50 | 19 | Good flow, very stiff |
| 34 | 70 | p-BuBSA | 20 | PETB | 10 | D7130 | 86 | 31 | 55 | 15 | Good flow, stiff |
| 35 | 70 | p-BuBSA | 20 | PETB | 10 | D7150 | 87 | 30 | 57 | 17 | Good flow, stiff |
| 36 | 70 | p-BuBSA | 30 | PETB | — | — | 83 | 29 | 54 | 8 | Good flow, too soft |
| 37 | 40 40 | p-TSA p-EBSA | — | — | 20 | CB509 | 98 | 77 | 21 | 14 | Little flow, reasonably stiff |
| 38 | 35 35 | p-TSA p-EBSA | 20 | PETB | 10 | CB509 | 97 | 74 | 23 | 10 | Reasonable flow, stiff |
| 39 | 35 35 | p-TSA p-EBSA | 20 | PET4T | 10 | CB509 | 99 | 73 | 26 | 11 | Reasonable flow, stiff |
| 40 | 80 | ANGLY | — | — | 20 | KHSK | 77 | 47 | 30 | 11 | Reasonable flow, too brittle |
| 41 | 70 | ANGLY | 10 | PETB | 20 | KHSK | 76 | 45 | 31 | 12 | Reasonable flow, stiff |
| 42 | 50 | ANGLY | 40 | PETB | 10 | KHSK | 74 | 38 | 36 | 18 | Good flow, stiff |
| 43 | 50 | ANGLY | 25 10 10 | PETB PET4T PET3T | 5 | KHSK | 78 | 44 | 34 | 9 | Good flow, stiff |

TABLE 4-continued

Selection of inks

| No | % by wt. | CM | % by wt. | ASM | % by wt. | AOP | Tm °C. | Tc °C. | Tm–Tc °C. | η 150° C. (mPa · s) | Assessment of print result, particularly directly after printing |
|---|---|---|---|---|---|---|---|---|---|---|---|
| 44 | 80 | HQHE | — | — | 20 | KHSK | 104 | 81 | 23 | 9 | Little flow, too brittle, not very transparent |
| 45 | 20 | HQHE | 80 | PETB | — | — | 99 | 65 | 34 | 11 | Reasonable flow, too soft |
| 46 | 30 | HQHE | 60 | PETB | 10 | KHSK | 100 | 60 | 40 | 16 | Reasonable flow, reasonably stiff |
| 47 | 30 | HQHE | 45 PETB<br>10 PET4T<br>10 PET3T | | 5 | KHSK | 103 | 69 | 34 | 15 | Reasonable flow, reasonably stiff |
| 48 | 85 | PETA | — | — | 15 | PSAA | 82 | 10 | 72 | 7 | Flow excessive, crystallisation retardation excessive |
| 49 | 80 | PETA | 10 | IPDI-MA | 10 | PSAA | 79 | <5 | >74 | 5 | Flow excessive, crystallisation retardation excessive |

We claim:

1. An ink composition for a meltable ink, usable in printing devices in which ink droplets are ejected from ducts, said composition comprising a meltable crystalline-setting monomer compound base material, said ink composition further comprising an amorphously setting monomer compound and an amorphous polymer or oligomer binder;
   wherein said amorphously setting monomer compound has a glass transition temperature (Tg) of 10–50° C., a viscosity less than 100 mPa.s at 150° C. and a molecular weight lower than 1,000 g/mol;
   wherein said amorphous polymer or oligomer binder has a Tg between 25 and 120° C., a weight-average molecular weight of between 1000 and 15,000 g/mol and a viscosity greater than 1000 mPa.s at 150° C.; and
   wherein said crystalline-setting monomer compound has a melting point lower than 110° C. and a viscosity at 150° C. of 1–10 mpa.s.

2. The ink composition of claim 1, wherein the amorphously setting monomer compound is selected from the group consisting of bis-urethanes, esters of pentaerythritol and dipentaerythritol, carbonates of dipentaerythritol, bis-amides, bis-sulfonamides and reaction products of epoxides and alcohols.

3. The ink composition of claim 1, wherein the quantity of the crystalline-setting monomer compound is from 60% by weight to 90% by weight, the quantity of the amorphously setting monomer compound is from 5% by weight to 20% by weight, and the quantity of the amorphous polymer or oligomer inder is from 5% by weight to 20% by weight, based on the total ink composition, the difference between the melting temperature and the crystallization temperature of the crystalline-setting monomer being less than 50° C.

4. The ink composition of claim 1, wherein the quantity of the crystalline-setting monomer compound is from 25 to 45% by weight, the quantity of the amorphously setting monomer compound is from 45% by weight to 65% by weight, and the quantity of the amorphous polymer or oligomer binder is from 5% by weight to 10% by weight, based on the total ink composition, the difference between the melting temperature and the crystallization temperature of the crystalline-setting monomer being less than 25° C.

5. The ink composition of claim 1, wherein the amorphously setting compound is selected from the group consisting of the reaction product of isophorone diisocyanate with methyl alcohol; the reaction product of 4,4'-dicyclohexylmethane diisocyanate with benzyl alcohol; the benzoate, toluate and anisilate esters of pentaerythritol and dipentaerythritol; phenyl carbonates or substituted phenyl carbonates of dipentaerythritol; and reaction products of the diglycidyl ether of bisphernol A with alkyl or cycloalkyl substituted phenols.

6. The ink composition of claim 1, wherein the crystalline-setting monomer compound is selected from the group consisting of alcohols, sulfonamides, bis-urethanes and amides.

7. The ink composition of claim 6, wherein the crystalline-setting monomer compound is selected from the group consisting of dodecanediol, hexadecanediol, para-toluene sulfonamide, paraethylbenzene sulfonamide, para-n-butylbenzene sulfonamide, 1-0-para-anisyl glycerol, meta-toluamide, the reaction product of hexamethylene diisocyanate and 2-methoxyethanol and mixtures of these compounds.

8. The ink composition of claim 1, wherein the viscosity of the total ink composition is lower than 25 mPa.s at 130° C.

* * * * *